United States Patent [19]
Provence

[11] Patent Number: 6,041,371
[45] Date of Patent: Mar. 21, 2000

[54] ASYNCHRONOUS INPUT/OUTPUT FOR INTEGRATED CIRCUITS THAT LATCHES EXTERNAL ASYNCHRONOUS SIGNAL IN FEEDBACK PATH OF STATE MACHINE

[75] Inventor: John D. Provence, Mesquite, Tex.

[73] Assignee: Texas Instruments Incorporated, Dallas, Tex.

[21] Appl. No.: 08/992,698

[22] Filed: Dec. 17, 1997

Related U.S. Application Data

[60] Provisional application No. 60/034,793, Dec. 19, 1996.

[51] Int. Cl.[7] .................................................. G06F 13/14
[52] U.S. Cl. ............................... 710/58; 326/46; 326/93; 327/155
[58] Field of Search ....................... 326/46, 93; 327/155, 327/141; 710/58

[56] References Cited

U.S. PATENT DOCUMENTS

| | | | |
|---|---|---|---|
| 4,939,394 | 7/1990 | Hashimoto | 327/155 |
| 5,389,838 | 2/1995 | Orengo | 326/93 |
| 5,555,213 | 9/1996 | DeLong | 326/93 |
| 5,834,957 | 11/1998 | Staton | 327/141 |

OTHER PUBLICATIONS

Yun, K.Y.; Dill, D.L., "Unifying synchronous/asynchronous state machine synthesis," Computer–Aided Design, 1993. Digest of Technical Papers, 1993 IEEE/ACM International Conference, pp. 255–260.

Primary Examiner—Thomas C. Lee
Assistant Examiner—Albert Wang
Attorney, Agent, or Firm—W. James Brady III; Frederick J. Telecky, Jr.

[57] ABSTRACT

An asynchronous latch including a finite state machine (301) and a level-sensitive latch (304) in a feedback path of the finite state machine. The input to the level-sensitive latch (304) is a signal generated by decoding the state of the finite state machine (301). The level-sensitive latch output is fed back to the finite state machine inputs to control next-state transitions. An asynchronous input line couples an asynchronous signal to the level-sensitive latch so that the asynchronous signal is used as a latching signal.

16 Claims, 2 Drawing Sheets

ASYNCHRONOUS INPUT/OUTPUT FOR INTEGRATED CIRCUITS THAT LATCHES EXTERNAL ASYNCHRONOUS SIGNAL IN FEEDBACK PATH OF STATE MACHINE

This application claims priority under 35 USC § 119(e)(1) of provisional application No. 60/034,793 filed Dec. 19, 1996.

BACKGROUND OF THE INVENTION

1. Field of the Invention

The present invention relates, in general, to input/output (I/O) circuitry for integrated circuits and, more particularly, to an I/O circuit for asynchronous edge detection that can be implemented using logic synthesis tools.

2. Relevant Background

Modern integrated circuits (ICs) are developed using synthesis flow based design techniques to reduce the design time and increased reliability of the designed products. Synthesis based techniques use synthesis tools that allow a designer to describe a circuit in a high level language (e.g., hardware description language or HDL). The synthesis tool is a complex set of computer programs that compile the HDL description into circuit schematics, programming instructions for programmable logic devices (e.g., field programmable gate arrays) or mask layouts for implementation in a semiconductor device. Synthesis tools allow a circuit to be simulated, emulated, and debugged before committing significant resources to reducing the circuit to hardware.

One limitation of synthesis-based techniques is that they are limited to synchronous design elements and do not allow for unclocked or unlatched feedback loops. The hardware description language requires or imposes timing constraints on each device. This prohibits the use of simple combinational logic feedback latches (e.g., SR latches, D latches, and the like) to handle asynchronous signals. However, interface circuits that serve to couple signals from one integrated circuit to another require a means for detecting and responding to asynchronous signals.

In the past, when multiple circuits were used in a system on a single circuit board or on a single chip, a common clock line synchronized the multiple integrated circuits. The common clock allowed synchronous action and synchronous communication between all the integrated circuits on a circuit board. However, modern integrated circuits are designed modularly and may use circuits that run on varying clock speeds in the same system or even on a single IC chip.

For example, a microprocessor having a first clock speed and a digital signal processing unit having a second clock speed may be integrated on a single IC. In portable equipment and energy saving "green" systems it is desirable to temporarily reduce clock speed of some of the circuits to save power. During this powered down state the IC should desirably capture inputs from other circuits so that it can power up and respond to those inputs. Hence, modern integrated circuits require communication between multiple devices each of which may be running at different and variable clock speeds.

One solution to this problem is to incorporated edge triggered latches in the design. The edge-triggered latch can capture and hold an input signal even while the circuit is powered down because it does not need a clock signal to latch the incoming data. However, as set out above, edge triggered latches are incompatible with synthesis-based designed techniques. In contrast to the rapid, automated design available with synthesis tools, edge triggered latches must be manually placed into a design from existing circuit libraries. Moreover, edge triggered latches require several transistors that increase size and cost of the integrated circuit.

Another solution that does not use edge triggered latches is to force the asynchronous request signal from one integrated circuit to extend one or more clock cycles in duration. The extended clock cycle ensures that the pulse will be detected by the receiving integrated circuit. This solution burdens the transmitting integrated circuit since it must be aware of the receiving circuit's clock frequency. This is often not practical when integrated circuits are allowed to vary the clock frequency to conserve power. Also, forcing the transmitting device to hold its signal for a number of clock cycles unnecessarily slows the transmitting device's performance and may commit latches and I/O circuitry within the transmitting device so that they are unavailable for other functions.

What is needed is a circuit that can be implemented using synthesis-based design techniques and mimics an edge triggered latch to receive asynchronous signals from neighboring integrated circuits without requiring extended clock cycles or edge triggered latches.

SUMMARY OF THE INVENTION

Briefly stated, the present invention involves an asynchronous latch including a finite state machine and a level-sensitive latch in a feedback path of the finite state machine. The input to the level-sensitive latch is a signal generated by decoding the state of the finite state machine. The level-sensitive latch output is fed back to the finite state machine inputs to control next-state transitions. An asynchronous input line couples an asynchronous signal to the level-sensitive latch so that the asynchronous signal is used as a latching signal.

Another aspect of the present invention involves an interface circuit including a synchronous finite state machine having a clock input, a control input, and a present state output. Each clock signal received on the clock input causes the state machine to transition sequentially through a plurality of predefined states when enabled by a signal on the control input. The state machine has a first predefined state corresponding to an asynchronous control state and a second predefined state corresponding to a latch clear state.

A decoder detects the first predefined state and generating an asynchronous control state signal on an output upon occurrence of the first state. The interface circuit includes a level-sensitive latch having an input coupled to the decoder output, an output, and a control terminal. The level-sensitive latch has a transparent state in which its output is determined by its input value and a latched state in which its output is stable. The transparent state and latched state are selected by the control terminal.

The interface circuit also includes transition control logic having an output coupled to the enable input of the state machine and having an input coupled to the output of the level-sensitive latch. The transition control logic is responsive to the state of the level-sensitive latch output to selectively apply the enable signal to the control input of the state machine. A selector circuit is included in the interface circuit having a first input coupled to receive an asynchronous signal, a second input coupled to detect the second predefined state from the state machine output, and an output coupled to the control input of the level-sensitive latch. The signal placed on the selector circuit output is selected from the first and second inputs based upon the binary signal received on the second input.

The present invention also involves a method for latching an external asynchronous signal. In this method, a state machine having a first predefined state corresponding to an asynchronous latch state is provided. Occurrence of the first predefined state in the state machine is detected. An asynchronous state signal is generated when the first predefined state is detected. Inhibiting the state machine is inhibited from changing from the first predefined state when the asynchronous state signal is generated. In response to receiving the external asynchronous signal, the asynchronous state signal is fed back to the state machine to enable the state machine to change from the first predefined state.

DETAILED DESCRIPTION OF THE PREFERRED EMBODIMENTS

Synthesis flow based design typically requires synchronous design methods that do not allow for unclocked/unlatched feedback loops. This prohibits the use of simple combination logic feedback latches (e.g. S-R latches, D-latches, etc.) in the design. Interfaces, such as Microprocessor Control Unit (MCU) interface 300 (shown in FIG. 2 and FIG. 3) are used in Digital Telephone Answering Devices for detecting and responding to asynchronous requests from a host processor.

Figure 1:
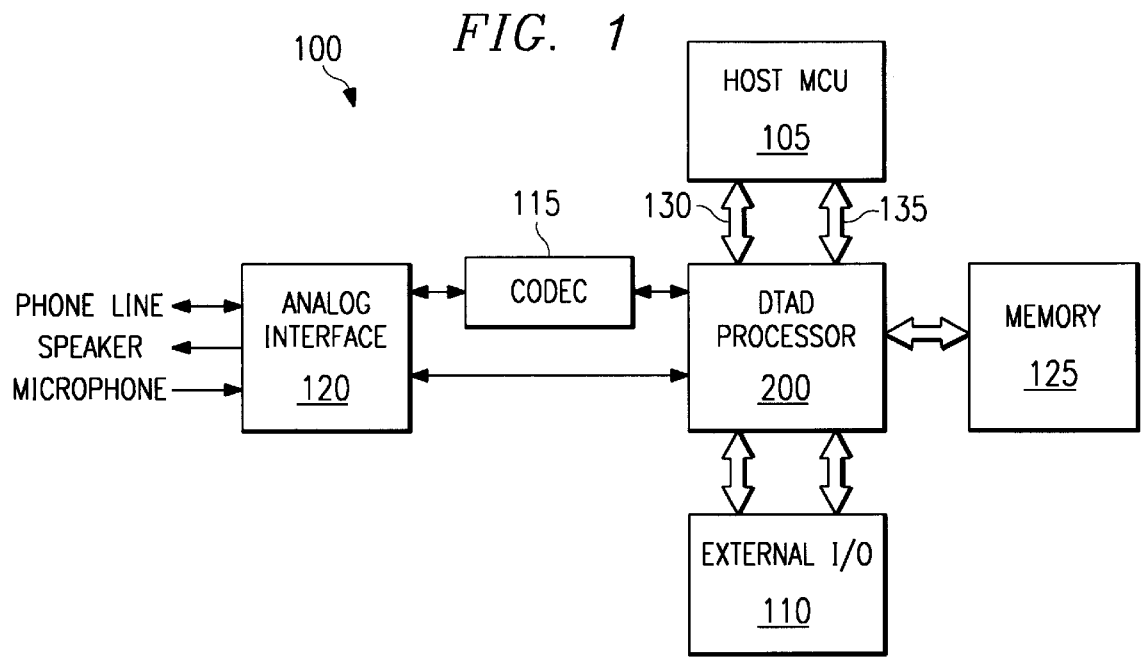
FIG. 1 illustrates a block diagram of MCU-DTAD system in accordance with the present invention.

In DTAD-MCU applications, host MCU 105 shown in FIG. 1 provides various functions such as fast forwarding through stored messages, message skipping, message saving, and the like. The design of DTAD processor 200 can then be specialized to handle speech and audio processing functions. In operation, host MCU 105 issues asynchronous requests (e.g., read and write requests) to DTAD processor 200. Typically, DTAD processor 200 responds to the requests from MCU 105 by executing a series of processes that perform the requested data transaction.

To enable successful data transactions, DTAD processor 200 desirably acknowledges receipt of the control signal from MCU 105. The processes of receiving and acknowledging control signals is commonly referred to as "handshaking". The response of DTAD processor 200 during handshaking can be modeled by a synchronous finite state machine such as SFSM 301 shown in FIG. 3. SFSM 301 relays request status to DTAD processor 200 and performs the requested interface protocol. In the absence of edge-triggered latches, the asynchronous request signal from host MCU 105 must be at least one system clock cycle duration. However, this constraint is not practical for DTAD-MCU applications. When limited to a design flow and standard cell library with no edge triggered latches, the present invention provides a design that can mimic edge triggered behavior in the MCU interface 300 (shown in FIG. 2 and FIG. 3).

FIG. 1 illustrates a DTAD-MCU system 100 incorporating a host MCU interface circuit 300 (shown in FIG. 2) in accordance with the present invention. The present invention will be described in terms of a DTAD-MCU system 100 having a host microprocessor control unit (MCU) 105 working in cooperation with DTAD processor 200. DTAD-MCU system 100 may be implemented on multiple circuit boards, a single circuit board, or in a single integrated circuit while taking advantage of the features of the present invention. Typical features included in a DTAD-MCU system 100 include an analog interface 120 that monitors analog inputs from a phone line, speaker, or microphone. Some analog inputs are coupled directly from analog interface 120 to DTAD processor 200 while bi-directional audio signals are typically preprocessed by codec 115 as they are coupled between DTAD processor 200 and analog interface 120.

DTAD processor 200 also communicates with external input/output (I/O) 110. External I/O 110 may include serial data (e.g., from analog interface chips for speech I/O) and/or parallel data from any number of external devices such as a PBX, caller ID devices, digital telephone sets, and the like. Desirably, external memory 125 is provided for storage of large quantities of data.

DTAD processor 200 communicates with host MCU 105 via a control bus 130 and a data bus 135. A significant advantage of the present invention is improved control signal communication over control bus 130. Asynchronous requests from MCU 105 typically cause DTAD processor 200 to perform a series of operations to implement a protocol requested by MCU 105. For example, MCU 105 may initiate a read request causing DTAD processor 200 to pass through a number of states that implement the read request. Similarly, MCU 105 may initiate a write request causing DTAD processor 200 to step through a number of states that perform the data write operation. The result of a successful read or write request is data transfer across data bus 135.

Because DTAD processor 200 and MCU 105 operate at different clock frequencies the MCU read and write requests are asynchronous with the clock of DTAD processor 200. Moreover, DTAD processor 200 may be in a power saving "sleep" mode to reduce power consumption during execution of routines that do not require high-speed processing. Hence, the read and write requests initiated by host MCU 105 over control bus 130 must be captured and acknowledged by DTAD processor 200 asynchronously.

Figure 2:
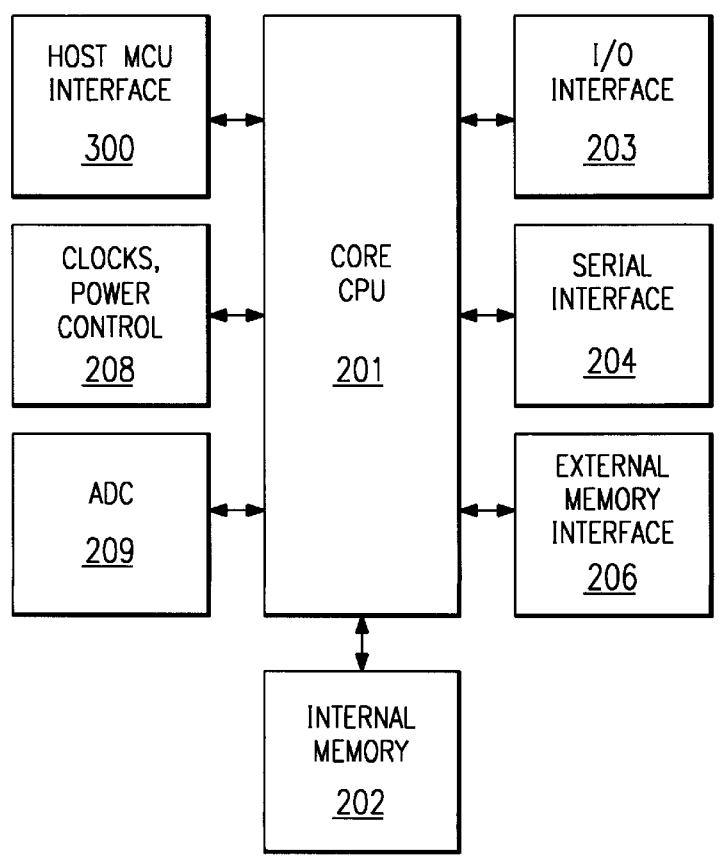
FIG. 2 shows a block diagram of the DTAD processor shown in FIG. 1.
Figure 3:
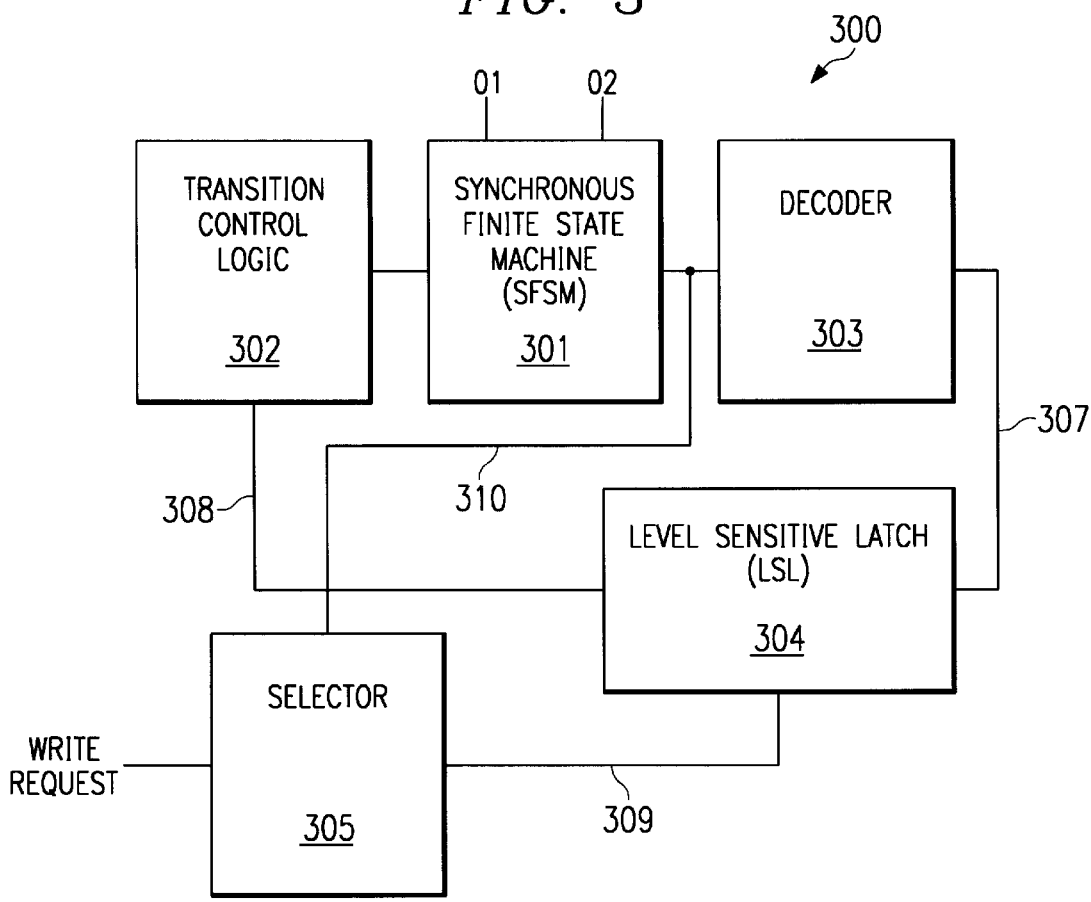
FIG. 3 illustrates in block diagram form a portion of a host MCU interface circuit in accordance with the present invention.

FIG. 2 shows a block diagram of DTAD processor 200 in greater detail. Core central processing unit (CPU) 201 can be any type of digital processor capable of handling the desired functionality. In a particular embodiment, core CPU 201 is a digital signal processor such as the T320C2xLP processor manufactured by Texas Instruments, Inc. DTAD processor 200 includes internal memory that is preferably non-volatile memory such as a PROM, EPROM, or EEPROM type memory for storing program code and static data.

I/O interface circuit 203 is responsible for interaction with external I/O 110 shown in FIG. 1. Although I/O interface circuit 203 could take advantage of the asynchronous latch in accordance with the present invention, the preferred embodiment uses conventional I/O circuitry in I/O interface 203. Serial interface 204 interacts with serial and analog signals from external I/O 110.

External memory interface 206 handles data read and write transactions with external memory 125 shown in FIG. 1. Analog to digital converter (ADC) 209 handles interaction with analog interface 120 and may handle other functions such as monitoring telephone line voltage, battery levels, and other non-speech analog signals. Clock and power control circuit 208 includes logic to slow down and speed up the internal clock of core CPU 201 to conserve power.

The host MCU interface 300 embodies the asynchronous I/O circuit in accordance with the present invention. MCU interface 300 is coupled to control bus 130 shown in FIG. 1 and captures asynchronous read and write signals from host CPU 105. In response to a read or write request, MCU interface 300 cycles through a predetermined sequence of states that direct core CPU 201 to perform the requested action. MCU interface 300 may include data bus 135 or data bus 135 may be implemented by dedicating some of I/O interface 203 to data communication with host MCU 105.

The process of passing through the predetermined number of states in MCU interface 300 can be modeled as a finite state machine. Synchronous finite state machine (SFSM) 301 shown in FIG. 3 receives a biphase clock signal comprising first and second phase clock signals $\phi_1$ and $\phi_2$ that control its synchronous operation. SFSM 301 is enabled by an input from transition control logic 302. In the particular example of FIG. 3, transition control logic 302 presents a logic HIGH signal to SFSM 301 causing the state machine 301 to pass from one state to the next upon receipt of biphase clock signals $\phi_1$ and $\phi_2$. When transition control logic 302 presents a logic LOW to SFSM 101, SFSM 301 will not transition from one state to the next state regardless of the clock signals. The output of SFSM 301 is a present state code which indicates the current state of SFSM 301.

The a preferred embodiment, SFSM 301 is implemented by two or more biphase shift registers (not shown) that are enabled by the output of transition control logic 302. Other state machine implementations are known, however. Synchronous shift registers are easily implemented using synthesis-based logic design techniques and so are useful in the implementation of SFSM 301.

In accordance with the present invention, decoder 303 is coupled to receive the present state code output by SFSM 301. Decoder 303 generates a logic LOW signal on line 307 until the present state code indicates asynchronous latch is necessary. In other words, one of the states programmed into SFSM 301 indicates that an asynchronous latch is desired. Alternatively, core CPU 201 can force the SFSM 301 to generate the asynchronous latch code when desired. When the present state code of SFSM 301 is the asynchronous latch code, MCU interface 300 is essentially in a "wait for asynchronous input" mode and will remain in that mode until further instruction or asynchronous input is received.

Figure 4:
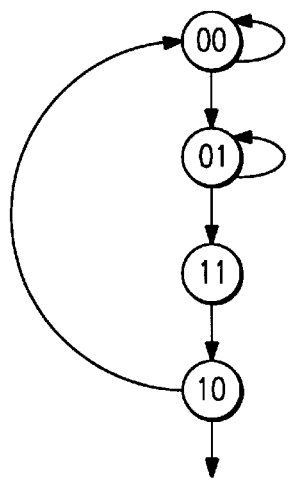
FIG. 4 illustrates a state diagram used in accordance with an interface in accordance with the present invention.

FIG. 4 illustrates a state diagram for SFSM 301 implemented as a 2-bit state machine. The output code "00" is designated to indicate asynchronous latch mode. When decoder 303 receives the 00 signal, the output signal on line 307 goes from logic LOW to logic HIGH. When any other signal is received by decoder 303, the output of decoder 303 remains a logic LOW. The output of decoder 303 is coupled to level-sensitive latch 304.

Level-sensitive latch 304 is coupled in a feedback path from the decoded output of SFSM 301 to the transition control logic 302. In this manner, the present state of SFSM 301 will control whether SFSM 301 can change to the next state. In other words, occurrence of the code or state designated as an asynchronous latch state (i.e., present state code "00" in FIG. 4) causes SFSM 301 to wait without changing states for indefinite number of clock cycles until the asynchronous signal is received. When LSL 304 receives a logic HIGH on latch control input 309 the signal on input line 307 from decoder 103 is passed through to transition control logic 302 on line 308. When LSL 304 receives a logic LOW control signal on line 309, the current output to transition control logic 302 is latched and will not change even if the signal on line 307 changes.

The latch control input 309 of LSL 304 is coupled to selector logic 305. Selector logic 305 is configured to normally couple the asynchronous input from MCU 105 to latch control line 309 of LSL 304. Selector 305 can alternatively select a latch clear signal on line 310 such that when the present state code corresponds to a code designated as a latch clear signal (i.e. state 11 in FIG. 4) on line 310, the latch clear signal is coupled to LSL 304 causing LSL 304 to become transparent.

In operation, SFSM 301 initiates in an asynchronous latch mode (i.e., state 00 in FIG. 4) and line 307 is placed at a logic HIGH. LSL 304 is in non-transparent mode and initially is "cleared" in that its output is logic LOW. In this stable state, the input to transition control logic 302 is LOW preventing further state changes. When the write request signal is received by selector 305, it is passed to LSL 304 causing LSL 304 to become transparent. The logic HIGH signal on line 307 is passed through to transition control logic 302 on line 308. In this manner, SFSM is enabled by the occurrence of the write request signal to begin stepping through its programmed states.

As soon as SFSM steps out of the asynchronous latch state into state 01 in FIG. 4, line 307 will become a logic low. State 01 causes other circuitry (not shown) to generate a write to MCU strobe and handshake signals. Other signals could be generated to provide alternative signaling. At this state, the control input to LSL 304 should place LSL 304 in a latched, non-transparent mode so that line 308 will be held at a logic HIGH.

SFSM 301 will continue to step through its programmed states to a present state 11 corresponding to a latch clear signal results. Selector 305 detects the latch clear present state code 11 and places LSL 304 in a transparent state. In this state, the logic LOW on line 307 is transferred to transition control logic 302 and the I/O circuit 300 is again paused waiting for asynchronous input. In this manner, interface circuit 300 in accordance, with the present invention can capture an asynchronous input when the pulse and timing are independent of the system clock of MCU interface circuit 300. This makes interface circuit 300 in accordance with the present invention synthesizable using available logic synthesis tools. State 10 in FIG. 4 is a dummy state that SFSM 301 passes through that does not have any corresponding action in the particular example described herein. Other functionality could be assigned to state 10 if desired.

A primary advantage of MCU interface circuit 300 in accordance with the present invention is that it can be implemented using synthesis design flow with timing constraints. Because the level-sensitive latch can be implemented in a synthesis design tool using timing constraints, unclocked/unlatched feedback path circuits are not needed and pulse detection is not dependent on DTAD system clock frequency or timing of the pulse relative to the system clock.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. An asynchronous latch comprising:

a finite state machine having an control input controlling next state transition;

a level-sensitive latch (LSL) in a feedback path of the finite state machine, wherein an input to the level-sensitive latch is a signal generated by decoding a state of the finite state machine and an output of the level-sensitive latch is fed back to the finite state machine input to control next-state transitions; and an asynchronous input line for coupling an external asynchronous signal to the level-sensitive latch, wherein the asynchronous signal is used as a latching signal.

2. The asynchronous latch of claim 1 wherein the finite state machine further comprises:

a clock input; and a present state output, wherein each clock signal received on the clock input causes the state machine to transition sequentially through a plurality of predefined states when enabled by a signal on the control input, the state machine having a first predefined state corresponding to an asynchronous control state and a second predefined state corresponding to a latch clear state.

3. The asynchronous latch of claim 2 further comprising: a decoder coupled to the finite state machine for detecting the first predefined state and generating an asynchronous control state signal on an output upon occurrence of the first state.

4. The asynchronous latch of claim 3 wherein the level-sensitive latch further comprises a control terminal coupled to the asynchronous input line, wherein the level-sensitive latch has a transparent state in which its output is determined by it input value and a latched state in which its output is stable, the transparent state and latched state being selected by the control terminal.

5. The asynchronous latch of claim 1 further comprising: a selector circuit having a first input coupled to receive the external asynchronous signal, a second input coupled to the state machine, and an output coupled to the asynchronous input line, wherein the signal placed on the selector output is selected from the first and second inputs based upon the signal on the second input.

6. An interface circuit comprising:

a synchronous finite state machine having a clock input, a control input, and a present state output, wherein each clock signal received on the clock input causes the state machine to transition sequentially through a plurality of predefined states when enabled by a signal on the control input, the state machine having a first predefined state corresponding to an asynchronous control state and a second predefined state corresponding to a latch clear state;

a decoder for detecting the first predefined state and generating an asynchronous control state signal on an output upon occurrence of the first state;

a level-sensitive latch having an input coupled to the decoder output, an output, and a control terminal, wherein the level-sensitive latch has a transparent state in which its output is determined by it input value and a latched state in which its output is stable, the transparent state and latched state being selected by the control terminal;

transition control logic having an output coupled to the enable input of the state machine and having an input coupled to the output of the level-sensitive latch, the transition control logic being responsive to the state of the level-sensitive latch output to selectively apply the enable signal to the control input of the state machine; and a selector circuit having a first input coupled to receive an asynchronous signal, a second input coupled to detect the second predefined state from the state machine output, and an output coupled to the control input of the level-sensitive latch, wherein the signal placed on the selector output is selected from the first and second inputs based upon the binary signal received on the second input.

7. An asynchronous latch comprising:

a synchronous finite state machine having a control input, and a present state output, wherein the state machine transitions sequentially through a plurality of predefined states when enabled by a signal on the control input, the state machine having a first predefined state corresponding to an asynchronous control state;

a decoder coupled to the state machine output for detecting the first predefined state;

a level-sensitive latch coupled to the decoder and having a control input, and an output coupled to the control input of the state machine; and an asynchronous input line coupled to the control input of the level-sensitive latch.

8. The asynchronous latch of claim 7 wherein the finite state machine has a second predefined state corresponding to a latch clear state and the asynchronous latch further comprises: a selector circuit having a first input coupled to receive an asynchronous signal, a second input coupled to detect the second predefined state from the state machine, and an output coupled to the asynchronous input line, wherein the signal placed on the selector output is selected from the first and second inputs based upon the binary signal received on the second input.

9. A method for latching an external asynchronous signal comprising the steps of:

providing a state machine having a first predefined state corresponding to an asynchronous latch state;

detecting when the state machine is in the first predefined state;

generating a asynchronous state signal when the first predefined state is detected;

inhibiting the state machine from changing from the first predefined state; and in response to receiving the external asynchronous signal, feeding back the asynchronous state signal to the state machine to enable the state machine to change from the first predefined state.

10. The method of claim 9 wherein the step of enabling comprises feeding back the asynchronous state signal to the state machine.

11. The method of claim 9 wherein the steps of detecting and generating comprises decoding the state machine output and the steps of inhibiting and enabling comprise feeding back the asynchronous state signal to the state machine.

12. The method of claim 9 second predefined state corresponding to a latch clear signal and the method further comprises the steps of:

detecting the second predefined state generating a latch clear signal when the second predefined state is detected;

inhibiting the state machine from changing states upon generating of the latch clear signal.

13. The method of claim 12 wherein the method comprises the steps of:
- selecting between the external asynchronous signal and the latch clear signal based upon the state of the latch clear signal;
- coupling the selected signal to an asynchronous latching line; and
- using the signal on the asynchronous latching line to selectively perform the inhibiting and the enabling steps.

14. An electronic system comprising:
- a first processing unit operating at a first clock frequency;
- a second processing unit operating at a second clock frequency;
- a control bus coupling control signals from the first processing unit to the second processing unit;
- a data bus coupling data signals from the first processing unit to the second processing unit;
- an interface circuit within the second processing unit and coupled to the control bus, the interface circuit having an asynchronous latch coupled to latch one of the control signals from the control bus, the asynchronous latch comprising:
  - a state machine having a control input controlling next state transition, and a present state output, wherein the state machine transitions sequentially through a plurality of predefined states when enabled by a signal on the control input, the state machine having a first predefined state corresponding to an asynchronous control state;
  - a decoder coupled to the state machine output for detecting the first predefined state;
  - a level-sensitive latch coupled to the decoder and having a latch control input, and an output coupled to the control input of the state machine; and
  - an asynchronous input line coupled to the control input of the level-sensitive latch.

15. The electronic system of claim 14 wherein the second processing unit has a variable clock frequency.

16. The electronic system of claim 14 further comprising:
- a selector circuit having a first input coupled to receive the control signal from the first processing unit;
- a second input coupled to the state machine; and
- an output coupled to the latch control input, wherein the signal placed on the selector output is selected from the first and second inputs based upon the state of the state machine detected by the selector circuit.

* * * * *